Feb. 28, 1933.  P. S. ECKLAND ET AL  1,899,187
BRAKE FOR DRIVEN AND STEERED WHEELS
Filed March 4, 1931  3 Sheets-Sheet 1
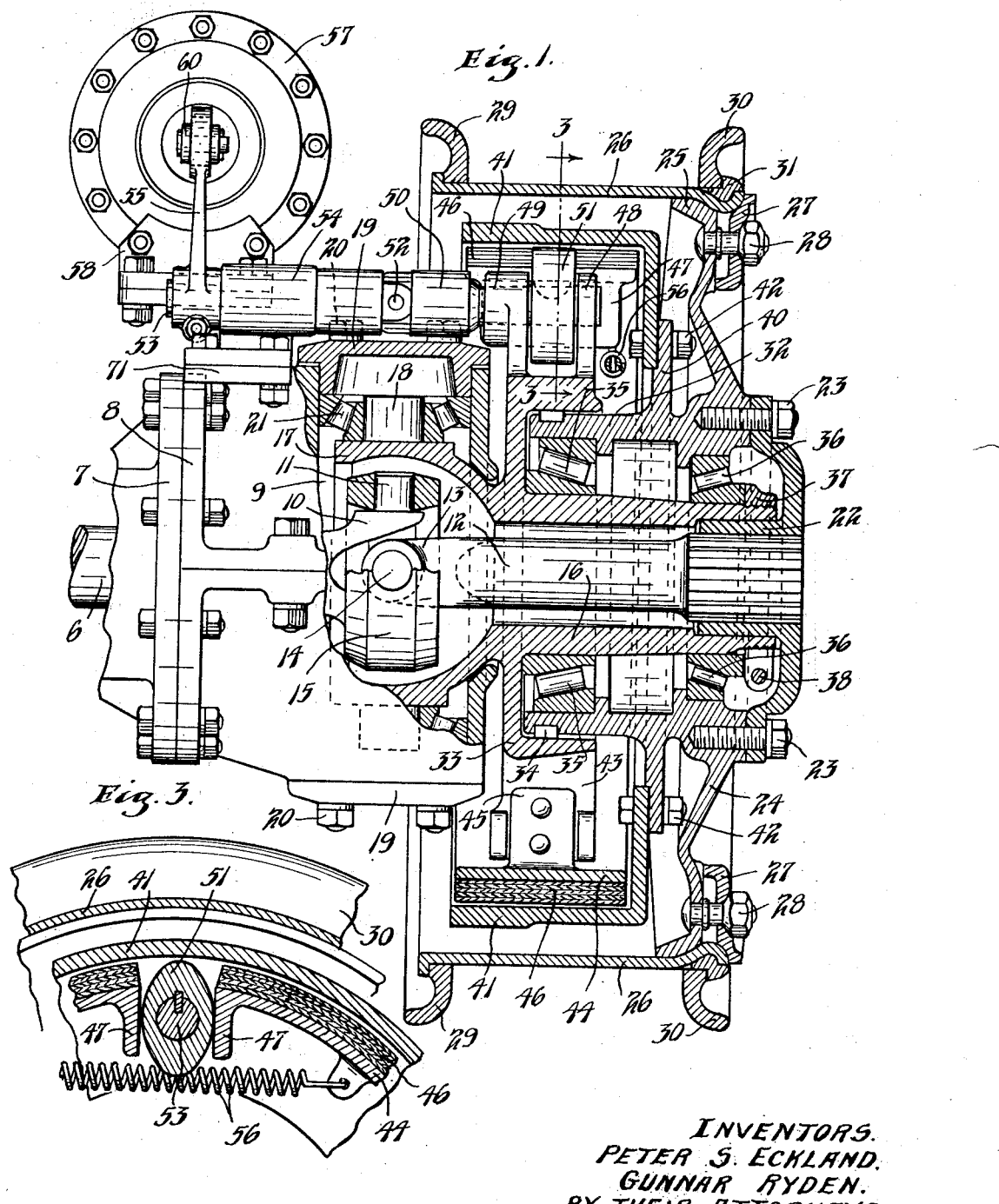
INVENTORS.
PETER S. ECKLAND.
GUNNAR RYDEN.
BY THEIR ATTORNEYS.
Williamson & Williamson

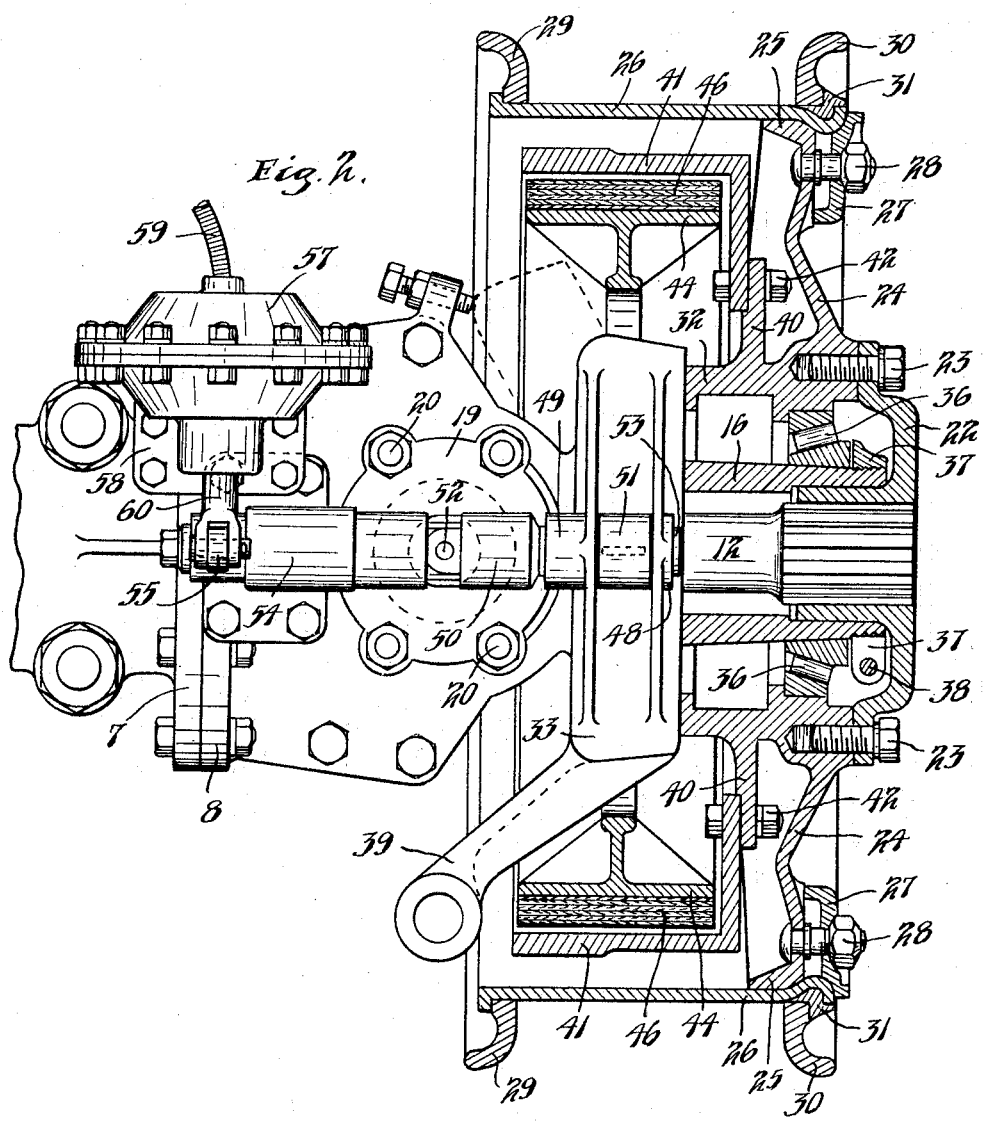

Feb. 28, 1933. P. S. ECKLAND ET AL 1,899,187
BRAKE FOR DRIVEN AND STEERED WHEELS
Filed March 4, 1931  3 Sheets-Sheet 3
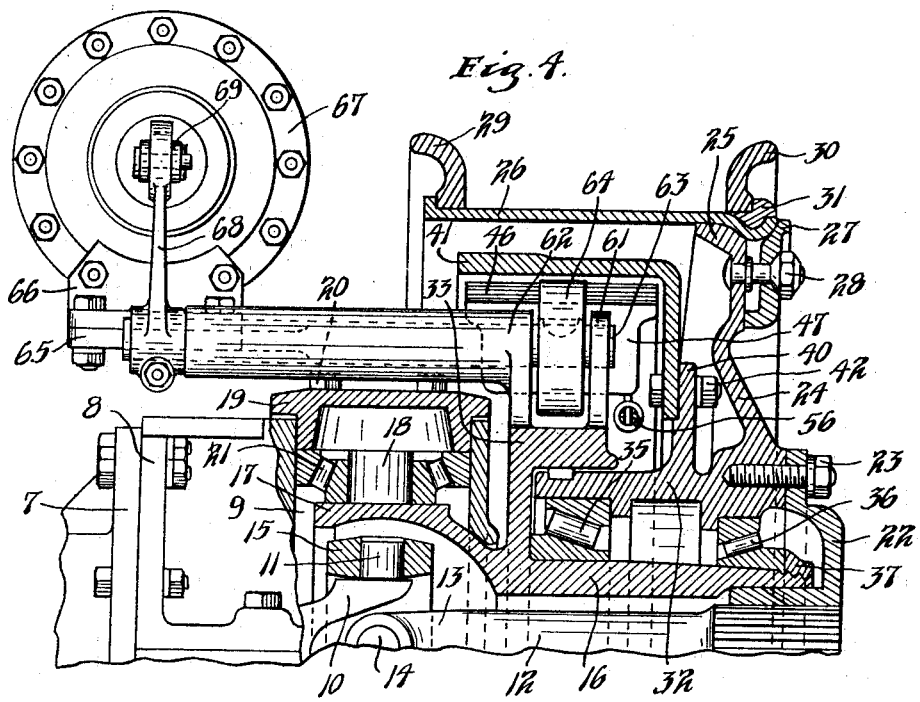
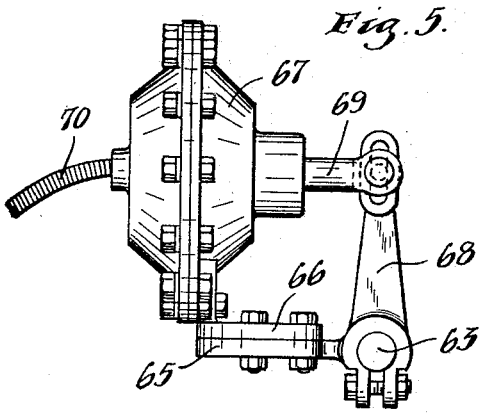
INVENTORS.
PETER S. ECKLAND.
GUNNAR RYDEN.
BY THEIR ATTORNEYS.

Patented Feb. 28, 1933

1,899,187

UNITED STATES PATENT OFFICE

PETER S. ECKLAND AND GUNNAR RYDEN, OF MINNEAPOLIS, MINNESOTA, ASSIGNORS TO ECKLAND BROS. COMPANY, OF MINNEAPOLIS, MINNESOTA, A CORPORATION OF MINNESOTA

BRAKE FOR DRIVEN AND STEERED WHEELS

Application filed March 4, 1931. Serial No. 519,937.

It is the object of this invention to provide a novel brake for a wheel that is both steered and driven in a vehicle.

To this end, the invention consists in the novel parts and novel combinations of parts, hereinafter defined in the claims and described in the following specification, made in connection with the accompanying drawings, wherein like reference characters refer to the same or similar parts throughout the various views, and, in which, Fig. 1 is a view taken partly in front elevation and partly in vertical section illustrating a vehicle wheel that is both steered and driven, and has a brake embodying the present invention applied thereto;

Fig. 2 is a view taken partly in plan and partly in horizontal section of the device shown in Fig. 1;

Fig. 3 is a vertical section taken on the line 3—3 of Fig. 1, as indicated by the arrows;

Fig. 4 is a view illustrating a portion of the structure shown in Fig. 1 with a slightly different type of actuating means for the brake than that shown in Figs. 1 to 3; and Fig. 5 is a view in side elevation of the brake actuating mechanism shown in Fig. 4.

Referring to the drawings, certain portions of a vehicle and a wheel that may be both steered and driven therefor, are illustrated. The wheel illustrated may be either a front or rear wheel for a vehicle, such, for example, as an automobile. An axle 6 suitably mounted for rotation in an axle housing 7 is provided and the housing 7 is connected at its end to a split housing 8 substantially spherical contour. The housing 8 forms a chamber 9 within which the outer end of the axle 6 is disposed and the outer end of the axle 6 is bifurcated, the furcations 10 of which are equipped with trunnions 11. A stub axle 12 is axially alined with the axle 6 and is bifurcated at its inner end, the furcations 13 of which are equipped with trunnions 14. The trunnions 11 are set at right angles relative to the trunnions 14 and the various trunnions 11 and 14 are journaled within a ring 15 located within the housing 8. The stub axle 12 extends through a sleeve 16 which has an inner semi-spherical end 17 fitting through an opening in the housing 8 and extending about the universal joint formed by the furcations 10 and 13, trunnions 11 and 14 and ring 15. The semi-spherical end 17 of sleeve 16 carries vertical trunnions 18, the axial centers of which are vertically alined with the center of the universal joint formed between the axle 6 and the stub axles 12. Above and below the respective trunnions 18, openings are provided in the housing 8 and these openings are closed by caps 19 which are secured to the housing as by bolts 20 and bear against roller bearings 21 interposed between the trunnions 18 and the lower edges of the caps.

The outer end of the stub axle 12 is grooved and has splined thereto a cap 22 which has a central hub portion fitting within an inner groove at the outer end of the sleeve 16 and this cap is secured as by bolts 23 to a disk 24. The disk 24 is substantially vertically disposed and is equipped at its circumferential edge with an inclined inturned flange 25 which engages against the inner side of a rib on a wheel rim 26, which projects inwardly from the disk 24. To clamp the disk 24 tightly to the rim 26, lugs 27 and nutted bolts 28 are provided, which lugs are adapted to be brought up tightly against the outer portion of the rib of the rim by means of the bolts 28. The rim 26 is adapted to receive and hold thereon an ordinary automobile tire and for this purpose inner and outer rings 29 and 30 are provided on the rim, the inner ring of which is adapted to be held in place by a short vertical flange at the inner end of the rim 26 and the outer ring 30 of which is adapted to be held in place by the lugs 27, bolts 28 and split ring 31. Of course, any suitable construction may be used for securing the tire in place on the rim 26 in place of the construction described.

The disk 24 has a central horizontal barrel 32 secured or formed integral therewith, which barrel encompasses the outer portion of sleeve 16 for rotation thereabout. The sleeve 16 is equipped with a cup portion 33 which encompasses the inner end of the barrel 32 and a packing ring 34 fits within a circumferential groove adjacent the inner end of the barrel 32 to seal the space between the barrel 32 and the cup 33. The barrel 32 is equipped with two inner flanges and roller bearings 35 and 36 are interposed between the barrel 32 and the sleeve 16 to bear respectively against these two flanges. In order that the roller bearings 35 and 36 may be taken up for wear, the sleeve 16 is provided with screw threads at its extreme outer end and a screw threaded collar 37 is mounted on the screw threaded end of the sleeve 16, the said collar being split and being adapted to be locked in place as adjusted by means of a bolt 38 running through lugs carried at the split ends of the collar. A steering arm 39 is secured to the cup 33 of sleeve 16 and this steering arm may be extended diagonally forwardly and inwardly from the cup 33 between the housing 8 and the rim 26 forward of the axle 6. The arm 39 will preferably be equipped with an apertured boss at its free end by which a tie rod may be connected to the arm for steering the wheel of the vehicle.

The construction thus far described is a typical wheel adapted to be both steered and driven for use on a vehicle. It will be noted that in the construction described, there is considerable space between the cup 33 of the sleeve 16 and the rim 26, and the rim 26 is, of course, open at its inner end to provide clearance between the rear end of the rim and the housing 8 for turning movement of the wheel. We propose to utilize the space between the rim 26 and the cup 33 to receive a brake for the wheel which can be either of the internal expansion type or of the external contraction type. The brake may be mechanically operated; it may be hydraulically operated or it may be operated by air pressure or by any other means. In the drawings, an internal expansion brake is illustrated which can be either hydraulically operated or operated by means of air pressure. In accordance with the embodiments of the invention illustrated, the barrel 32 is equipped with a vertical flange 40 inwardly from the main portion of the disk 24 and a brake drum 41 of hollow cylindrical-shape is provided which has a vertical centrally projecting flange at its outer edge secured to the flange 40 as by means of nutted bolts 42. The brake drum 41 has a smooth, inner braking surface of suitable width. The cup 33 is equipped with a short arm 43, which projects radially from the cup at its lower portion and a brake shoe 44 has a pair of spaced centrally projecting lugs 45 secured to the arm 44 between side lugs on the said arm. The brake shoe 44 may be made of spring material and has brake lining 46 secured to its outer surface. The shoe 44 will, of course, be of substantially circular-shape to conform generally to the contour of the inner surface of the drum 41, the shoe having closely spaced ends 47 projecting centrally from the main portion of the shoe at the top thereof.

In accordance with the form of the invention shown in Figs. 1 to 3, the cup 33 is provided with a pair of spaced bearing members 48 and 49 which project upwardly from the central portion of its top surface. A shaft 50 is journaled in these bearing members 48 and 49 and this shaft has secured thereto between the two bearing members a double acting cam 51 which fits between and engages the ends 47 of the brake shoe 43. The shaft 50 projects inwardly from the bearing member 49 and is connected by a universal joint 52 to a shaft 53 supported in a bearing 54 bolted or otherwise secured to a plate 71 forming a portion of the top surface of the housing 8. The center of the universal joint 52 is located in a vertical line running directly through the axis of the trunnions 18 and the center of the universal joint connecting the axle 6 with the stub axle 12. An arm 55 is secured to the inner end of the shaft 53 and by swinging this arm 55, the shaft 50 can be rocked to cause the cam 51 to spread the ends 47 of the brake shoe 43 and thereby cause the brake lining 46 to engage the drum 41. To normally retract the brake lining 46 from the drum 41 and to hold the ends 47 of the shoe 44 in engagement with the cam 51, a coiled tension spring 56 is provided and this spring is secured at its two ends to suitable lugs provided on the inner surface of the shoe 44 below the level of the ends 47 of the shoe. As has been stated, the brake can be operated by mechanical means, hyldraulic means, air pressure or in any other desired manner. As illustrated, a casing 57 is provided which is secured by a bracket 58 to the top of the housing 8. A flexible conduit 59 running from any suitable source of fluid or air supply, runs to the casing 57. A rod 60 extending from the casing 57 is connected to the upper end of the arm 55 and this rod is adapted to be projected to and from the casing 57 in well known manner as compressed air is supplied to the casing or as the fluid supplied to the casing through the flexible conduit 59 is placed under increased pressure. Due to the fact that the universal joint 52 connecting the shaft 50 with the shaft 53 is in vertical alinement with the center of the universal joint connecting the axle 6 to the stub axle 12, and with the axis of the trunnions 18, it will be seen that the wheel can readily be steered from the steering arm 39 and yet the brake can be properly applied without interference with the steering action.

In Figs. 4 and 5, a slightly different construction is illustrated for operating the brake. The cup 33 is provided with an upstanding bearing member 61 and a sleeve 62 spaced from the bearing member 61 is also applied to the cup member 33 at its upper central surface. A shaft 63 is journaled in the bearing member 61 and the sleeve 62 and this shaft carries a double acting cam 64 which fits between the ends 47 of the brake shoe 44 in the same manner as does the cam 51. The sleeve 62 at its inner end has a plate 65 formed thereon on which rests a bracket 66 to which a casing 67 similar in all respects to the casing 57, is secured. An arm 68 is secured to the outer end of the shaft 63 and this arm is connected to a rod 69 mounted in the casing 67 for projection to and from the casing in the same manner as the rod 60 in the previously described construction. Fluid or air is supplied to the casing 67 through a flexible conduit 70. With the construction disclosed in Figs. 4 and 5, the casing 67 instead of being permanently situated on the housing 8 as in the previously described construction, will move with the wheel as it is steered. The flexible conduit 70 will, of course, permit of this movement without interference with the steering action of the wheel. The construction illustrated in Figs. 4 and 5 is particularly adapted for use where air or fluid are used for actuating the brake.

It will be seen that a very serviceable brake has been provided for use in connection with wheels that are both steered and driven. The brake will, of course, be varied in construction for use with steered and driven wheels of different construction than that illustrated. A different type of brake from that illustrated can, of course, be applied to the driven and steered wheel, while any known means can be used for operating the brake.

The brake of the present invention has been amply and successfully demonstrated in actual practice.

It will, of course, be understood that various changes may be made in the form, details, arrangement and proportions of the various parts without departing from the scope of the present invention.

What is claimed is:—

1. In a vehicle, an axle housing, a driving axle located within said housing, a stub axle connected by universal joint to said driving axle, a wheel secured to the outer end of said stub axle, a bearing for said wheel vertically pivoted to said housing, a brake drum secured to said wheel, a cooperating brake shoe mounted on said bearing, a cam shaft journaled on said bearing, a cam mounted on said cam shaft for actuating said brake shoe, an arm secured to said shaft, a fluid tight casing suitably mounted, a plunger mounted in said casing and pivotally connected to said arm and a fluid conduit running to said casing.

2. In a vehicle, an axle housing, a driving axle located within said housing, a stub axle connected by universal joint to said driving axle, a wheel secured to the outer end of said stub axle, a bearing for said wheel vertically pivoted to said housing in vertical alinement with the center of said universal joint, a brake drum carried by said wheel, a cooperating brake shoe carried by said bearing, a two section cam shaft, the sections of which are interconnected by universal joint in vertical alinement with the center of said first mentioned universal joint and one section of which is journaled on said bearing and the other section of which is journaled in said housing, a cam secured to one end of said cam shaft and adapted to operate said shoe, an arm connected to the other end of said cam shaft, a fluid tight casing securing to said axle housing, a plunger within said casing and pivotally connected to said arm and a fluid conduit connected to said casing.

In testimony whereof we affix our signatures.

PETER S. ECKLAND.
GUNNAR RYDEN.